(12) United States Patent
Zhang et al.

(10) Patent No.: US 12,473,770 B2
(45) Date of Patent: Nov. 18, 2025

(54) AUTOMATIC DOOR OPENING AND CLOSING MECHANISM AND REFRIGERATOR

(71) Applicant: Gree Electric Appliances, Inc. of Zhuhai, Guangdong (CN)

(72) Inventors: Aoxiang Zhang, Guangdong (CN); Shanshan Huang, Guangdong (CN); Zhe Sun, Guangdong (CN); Jinchao Yan, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 39 days.

(21) Appl. No.: 18/687,969

(22) PCT Filed: Jul. 26, 2022

(86) PCT No.: PCT/CN2022/107859
§ 371 (c)(1),
(2) Date: Feb. 29, 2024

(87) PCT Pub. No.: WO2023/060982
PCT Pub. Date: Apr. 20, 2023

(65) Prior Publication Data
US 2024/0376764 A1    Nov. 14, 2024

(30) Foreign Application Priority Data

Oct. 12, 2021   (CN) .......................... 202111187737.5

(51) Int. Cl.
*E05F 15/614*     (2015.01)
*F25D 23/02*      (2006.01)

(52) U.S. Cl.
CPC .......... *E05F 15/614* (2015.01); *F25D 23/028* (2013.01); *E05Y 2201/216* (2013.01); *E05Y 2900/31* (2013.01); *F25D 2323/02* (2013.01)

(58) Field of Classification Search
CPC .. E05F 15/614; F25D 23/028; F25D 2323/02; E05Y 2201/216; E05Y 2900/31
See application file for complete search history.

(56) References Cited

U.S. PATENT DOCUMENTS

2010/0273598 A1   10/2010  Kusuda

FOREIGN PATENT DOCUMENTS

| CN | 201106350 Y | 8/2008 |
|---|---|---|
| CN | 102767330 A | 11/2012 |

(Continued)

OTHER PUBLICATIONS

PCT/CN2022/107859, International Search Report, Oct. 14, 2022.
(Continued)

*Primary Examiner* — Huan Le
(74) *Attorney, Agent, or Firm* — The Webb Law Firm

(57) ABSTRACT

An automatic door opening and closing mechanism and a refrigerator. The automatic door opening and closing mechanism includes a power assembly, configured to provide a driving force; a driving gear, being drivingly connected to the power assembly and provided with a first meshing tooth; a driven gear, being movably arranged relative to the driving gear, and the driven gear being provided with a second meshing tooth matching the first meshing tooth; and an electromagnetic clutch assembly, being installed on the driving gear and the driven gear, and the electromagnetic clutch assembly being configured to drive the driving gear to mesh with or separate from the driven gear.

13 Claims, 4 Drawing Sheets

(56) References Cited

FOREIGN PATENT DOCUMENTS

| CN | 105971439 A | | 9/2016 | | |
|---|---|---|---|---|---|
| CN | 106500444 A | | 3/2017 | | |
| CN | 106761136 A | | 5/2017 | | |
| CN | 106869655 A | | 6/2017 | | |
| CN | 107654583 A | * | 2/2018 | .............. | H02K 7/11 |
| CN | 108679913 A | | 10/2018 | | |
| CN | 109373689 A | | 2/2019 | | |
| CN | 208550527 U | | 3/2019 | | |
| CN | 208567281 U | | 3/2019 | | |
| CN | 109695396 A | | 4/2019 | | |
| CN | 112503151 A | | 3/2021 | | |
| CN | 113074503 A | * | 7/2021 | ........... | F25D 23/028 |
| CN | 113863803 A | | 12/2021 | | |
| CN | 216893974 U | | 7/2022 | | |
| DE | 2325987 | | 12/1973 | | |
| GB | 1423453 | | 2/1976 | | |
| WO | 02102615 A2 | | 12/2002 | | |
| WO | 2005019577 A1 | | 3/2005 | | |
| WO | 2016000465 A1 | | 1/2016 | | |

OTHER PUBLICATIONS

CN 202111187737.5, First Examination Opinion Notification Letter, Jan. 17, 2025.
EP 22879929.2, Extended European Search Report, Dec. 5, 2024.

* cited by examiner

AUTOMATIC DOOR OPENING AND CLOSING MECHANISM AND REFRIGERATOR

CROSS-REFERENCE TO RELATED APPLICATIONS

This application is the United States national phase of International Patent Application No. PCT/CN2022/107859, filed Jul. 26, 2022, and claims priority to Chinese Patent Application No. 202111187737.5, filed Oct. 12, 2021, the disclosures of which are hereby incorporated by reference in their entireties.

BACKGROUND OF THE INVENTION

Field of the Invention

The present disclosure relates to the technical field of home appliances, in particular to an automatic door opening and closing mechanism and a refrigerator.

Description of Related Art

As electromechanical control technology and intelligent technology continue to expand into the field of home appliances, consumers are increasingly pursuing ease of use, intelligence and beauty in the use experience of home appliances. As a basic function of refrigerator intelligence, automatic door opening and closing of refrigerator is increasingly widely used.

Currently, there are many ways to automatically open and close a refrigerator door. The refrigerator door needs to resist a lot of comprehensive resistance in the initial stage of door opening because the closed door is subject to various closing forces such as the magnetic stripe attraction of a door seal, the elastic force of a door closer, the clamping force of a flip beam, and the negative pressure generated by the low temperature in the refrigerator. Given this, most automatically opening and closing a door solutions provide an ejection device. First, an independent ejection mechanism is used to open the refrigerator door to a small angle. At this time, various closing forces such as the magnetic stripe attraction of the door seal, the elastic force of the door closer, the clamping force of the flip beam, and the negative pressure generated by the low temperature in the refrigerator will disappear or weaken when the door is opened, and the subsequent door opening action relies on another mechanism that assists the door body to rotate.

Currently, the free opening and closing of the refrigerator door is hindered by the automatic opening and closing door mechanism when the refrigerator does not need to use the automatic door opening and closing mechanism or cannot use the automatic door opening and closing mechanism because of powering off or drive unit failure.

SUMMARY OF THE INVENTION

The embodiments of the present disclosure provide an automatic door opening and closing mechanism and a refrigerator to solve the problem in the prior art that the free opening and closing of the refrigerator door is hindered by the automatic opening and closing door mechanism when the refrigerator does not need to use the automatic door opening and closing mechanism or cannot use the automatic door opening and closing mechanism because of powering off or drive unit failure.

According to one aspect of the present disclosure, provided is an automatic door opening and closing mechanism, including: a power assembly configured to provide a driving force; a driving gear drivingly connected to the power assembly and provided with a first meshing tooth; a driven gear movably arranged relative to the driving gear, and the driven gear being provided with a second meshing tooth matching the first meshing tooth; and an electromagnetic clutch assembly installed on the driving gear and the driven gear, the electromagnetic clutch assembly being configured to drive the driving gear to mesh with or separate from the driven gear.

In some embodiments, the electromagnetic clutch assembly includes an armature and an electromagnetic coil, and the armature and the electromagnetic coil are respectively arranged on the driving gear and the driven gear.

In some embodiments, the electromagnetic clutch assembly further includes a clutch spring which is respectively connected to the driving gear and the driven gear, and the clutch spring is configured to apply a force to separate the driving gear from the driven gear.

In some embodiments, the automatic door opening and closing mechanism further includes:
  a spring holder, the driven gear being rotatably arranged on the spring holder; and
  a torsion spring, the torsion spring having one end connected to the driven gear and the other end connected to the spring holder.

In some embodiments, the spring holder is provided with a receiving groove; the driven gear has a matching protruding component, and the matching protruding component is rotatably arranged in the receiving groove; and the matching protruding component and the receiving groove form a receiving space, and the torsion spring is arranged in the receiving space.

In some embodiments, the driven gear is provided with a contact protruding component, and the contact protruding component is configured to rotate with the driven gear; and a protection switch is arranged on the spring holder; the protection switch is arranged on a moving path of the contact protruding component, and the contact protruding component is capable of triggering the protection switch during movement of the contact protruding component.

In some embodiments, the matching protruding component is provided with a spring baffle that matches the torsion spring, and the spring baffle is located inside the receiving groove; and
  the contact protruding component is located outside the receiving groove; and the contact protruding component and the spring baffle are connected to each other and integrally formed.

In some embodiments, the automatic door opening and closing mechanism further includes: an angular velocity sensor, installed on a predetermined structure; and a magnetic ring, installed on the spring holder and matching the angular velocity sensor.

In some embodiments, the automatic door opening and closing mechanism further includes a hinge having a fixed shaft; the spring holder is fixedly connected to the fixed shaft; and both the driving gear and the driven gear are installed on the fixed shaft.

In some embodiments, the driving gear is movably arranged along an axial direction of the fixed shaft; the driven gear is relatively fixedly arranged along the axial direction of the fixed shaft; and the driving gear is close to or away from the driven gear along the axial direction of the fixed shaft.

In some embodiments, the fixed shaft includes a first shaft segment and a second shaft segment that are connected to each other, and a diameter of the first shaft segment is greater than that of the second shaft segment; the driving gear is arranged on the first shaft segment, the driven gear is arranged on the second shaft segment, a limiting step is formed at a joint of the first shaft segment and the second shaft segment, and the driven gear has one end abutting against the limiting step and the other end abutting against the spring holder.

In some embodiments, the power assembly includes a motor, a reducer and an output gear, and the output gear is drivingly connected to an output shaft of the motor through the reducer; and a gear portion is arranged on the driving gear, and the output gear meshes with the gear portion.

According to another aspect of the present disclosure, provided is a refrigerator, including the automatic door opening and closing mechanism described above.

In some embodiments, the refrigerator includes a door and a refrigerator body, and the automatic door opening and closing mechanism is installed in the door.

In some embodiments, the automatic door opening and closing mechanism includes: a hinge having a fixed shaft, the hinge being fixed on the refrigerator body, the fixed shaft being at least partially located in the door, and the door rotating around the fixed shaft; a spring holder fixedly connected to the fixed shaft, and the driven gear being rotatably arranged on the spring holder; and a torsion spring, the torsion spring having one end connected to the driven gear and the other end connected to the spring holder.

When the automatic door opening and closing mechanism of the present disclosure is applied to a refrigerator, the driving gear and the driven gear in the automatic door opening and closing mechanism are in a separated state from each other for a long time (i.e., there is no need to open and close the door in a normal operating state of the refrigerator). After the automatic door opening and closing mechanism receives automatic opening instructions and closing instructions, the electromagnetic clutch assembly is energized to perform work, and the driving gear and the driven gear which are in a separated state before mesh with each other under the action of the electromagnetic clutch assembly. The driving force of the power assembly is transmitted to the driving gear, the driving gear drives the driven gear, and the driven gear then drives the door of the refrigerator to open or close. When the refrigerator does not need to use the automatic door opening and closing mechanism or cannot use the automatic door opening and closing mechanism because of powering off or drive unit failure, the electromagnetic clutch assembly is also incapable of performing work, causing the driving gear and the driven gear to separate from each other. In this case, the driving gear and the driven gear, which play a major role in the automatic door opening and closing mechanism, will no longer mesh with each other or form resistance, and the door is capable of being opened and closed freely without being hindered by the automatic door opening and closing mechanism. The automatic door opening and closing mechanism not only enables the refrigerator to realize the high-end function of automatically opening and closing the door, it also improves the user experience and increases user satisfaction during powering off and failure.

BRIEF DESCRIPTION OF THE DRAWINGS

The terms Fig., FIG. Figs., FIGS. Figure, and Figures are used interchangeably in the specification to refer to the corresponding figures in the drawings.

DESCRIPTION OF THE INVENTION

The present disclosure will be further described in detail below in conjunction with the accompanying drawings and specific embodiments, but the present disclosure is not limited thereto.

Figure 1:
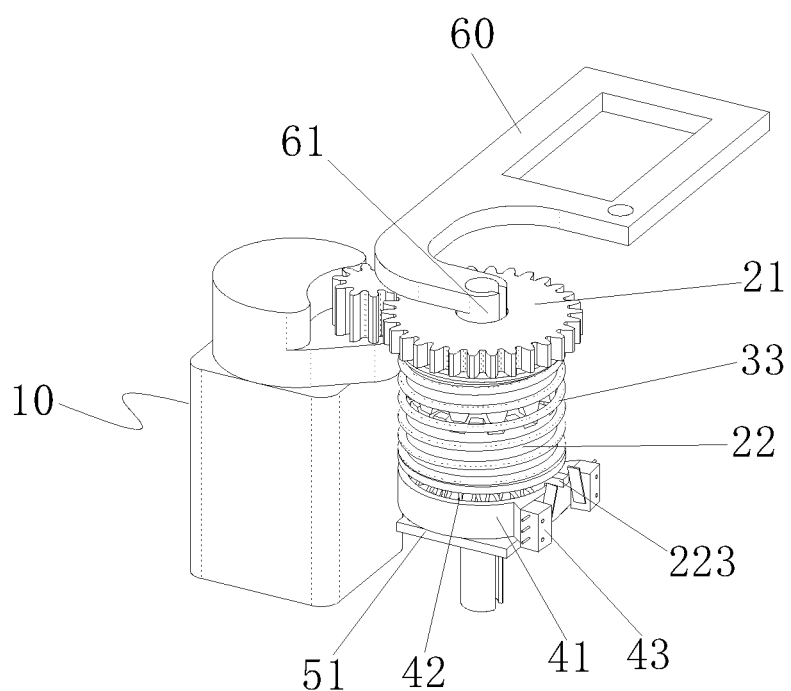
FIG. 1 is a schematic structural diagram of an automatic opening and closing door structure according to an embodiment of the present disclosure.
Figure 2:
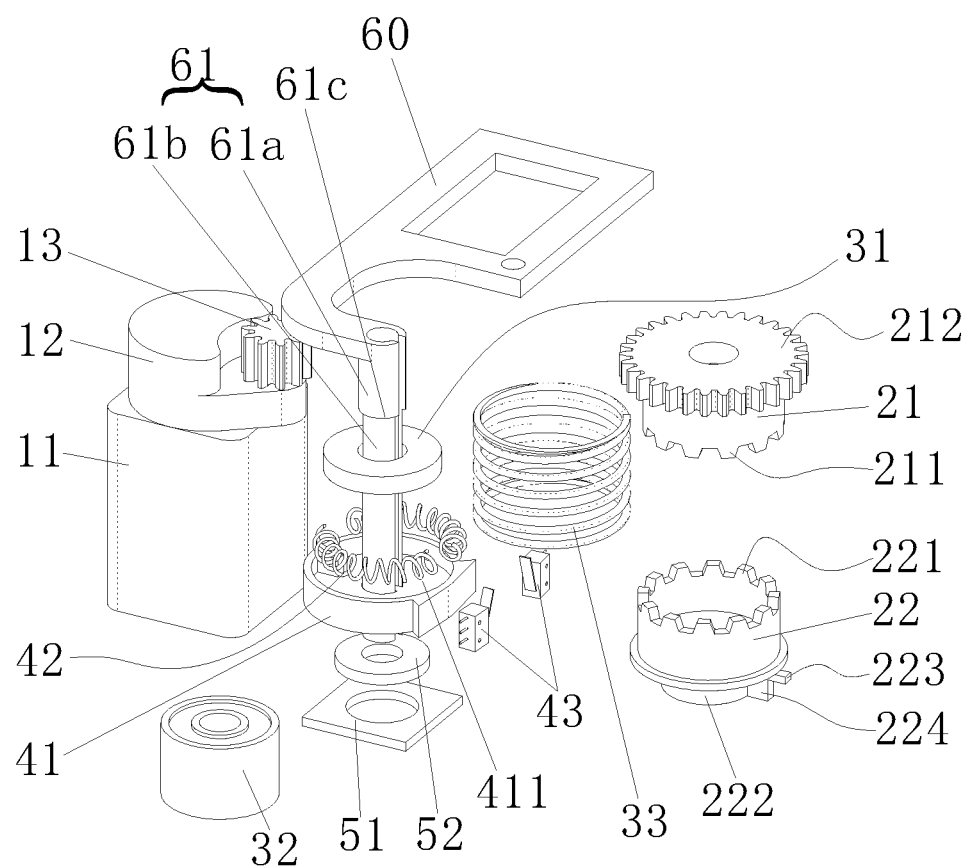
FIG. 2 is a schematic exploded structural diagram of the automatic opening and closing door structure according to the embodiment of the present disclosure.

Referring to FIGS. 1 and 2, according to an embodiment of the present disclosure, provided is an automatic door opening and closing mechanism, including: a power assembly 10, a driving gear 21, a driven gear 22 and an electromagnetic clutch assembly 30. The power assembly 10 is configured to provide a driving force. The driving gear 21 is drivingly connected to the power assembly 10 and provided with a first meshing teeth 211. The driven gear 22 is movably arranged relative to the driving gear 21. The driven gear 22 is provided with a second meshing teeth 221 that match the first meshing teeth 211. The electromagnetic clutch assembly 30 is installed on the driving gear 21 and the driven gear 22, and the electromagnetic clutch assembly 30 is configured to drive the driving gear 21 to mesh with or separate from the driven gear 22.

When the automatic door opening and closing mechanism of the present disclosure is applied to a refrigerator, the driving gear 21 and the driven gear 22 in the automatic door opening and closing mechanism are in a separated state from each other for a long time (i.e., there is no need to open and close the door in a normal operating state of the refrigerator). After the automatic door opening and closing mechanism receives automatic opening instructions or closing instructions, the electromagnetic clutch assembly 30 is energized to perform work, and the driving gear 21 and the driven gear 22 which are in a separated state before mesh with each other under the action of the electromagnetic clutch assembly 30. The driving force of the power assembly 10 is transmitted to the driving gear 21, the driving gear 21 drives the driven gear 22, and the driven gear 22 then drives the door of the refrigerator to open or close. When the refrigerator does not need to use the automatic door opening and closing mechanism or cannot use the automatic door opening and closing mechanism because of powering off or drive unit failure, the electromagnetic clutch assembly 30 is also incapable of performing work, causing the driving gear 21 and the driven gear 22 to separate from each other. In this case, the driving gear and the driven gear, which play a major role in the automatic door opening and closing mechanism, will no longer mesh with each other or form resistance, and the door is capable of being opened and closed freely without being hindered by the automatic door opening and closing mechanism. The automatic door opening and closing mechanism not only enables the refrigerator to realize the high-end function of automatically opening and closing the door, it also improves the user experience and increases user satisfaction during powering off and failure.

The electromagnetic clutch assembly 30 in the automatic door opening and closing mechanism is normally powered off, causing the driving gear 21 and the driven gear 22 to separate from each other, and the electromagnetic clutch assembly 30 will bring the driving gear 21 and the driven gear 22 close to each other and meshed with each other after being energized.

The electromagnetic clutch assembly 30 includes an armature 31 and an electromagnetic coil 32, and the armature 31 and the electromagnetic coil 32 are respectively arranged on the driving gear 21 and the driven gear 22. In this embodiment, the armature 31 is installed on the driving gear 21, and the electromagnetic coil 32 is installed on the driven gear 22. After receiving automatic door opening and closing instruction, the electromagnetic coil 32 is energized, and the armature 31 comes close to the electromagnetic coil 32 under the action of magnetic force, and the driving gear 21 comes close to the driven gear 22 at the same time under the action of the armature 31. The first meshing teeth 211 and the second meshing teeth 221 gradually engage and form a meshing fit. If the electromagnetic coil 32 is powered off (the refrigerator is powered off or the electromagnetic coil 32 is actively powered off) the armature 31 will not be attracted by the magnetic force, and the driving gear 21 and the driven gear 22 will still be separated from each other. Of course, the armature 31 may also be installed on the driven gear 22, and the electromagnetic coil 32 can be installed on the driving gear 21. These are all structural patterns that can achieve the same function.

In some embodiments, the electromagnetic clutch assembly 30 further includes a clutch spring 33 which is respectively connected to the driving gear 21 and the driven gear 22, and the clutch spring 33 is configured to apply a force to separate the driving gear 21 from the driven gear 22. After the driving gear 21 and the driven gear 22 are meshed with each other, they need to return to the normally separated state. In this case, if the electromagnetic coil 32 is powered off (the refrigerator is actively powered off), the armature 31 will not be attracted by the magnetic force, and the force applied by the clutch spring 33 separates the driving gear 21 from the driven gear 22. When the refrigerator is powered off or the refrigerator actively powers off because the automatic door opening and closing mechanism fails, the electromagnetic coil 32 will not generate a magnetic force, and the clutch spring 33 can always keep the driving gear 21 and the driven gear 22 separated from each other. When the automatic door opening and closing function is enabled, after the electromagnetic coil 32 is energized, the armature 31 is attracted and drives the driving gear 21 to overcome the elastic force of the clutch spring 33 and mesh with the driven gear 22.

Referring to FIGS. 1 and 2, the driving gear 21 is arranged above the driven gear 22, the first meshing teeth 211 are located on a lower end surface of the driving gear, and the second meshing teeth 221 are located on an upper end surface of the driven gear. The driving gear and the driven gear are each provided with a cavity. The armature 31 is fixed in the cavity of the driving gear, and the electromagnetic coil 32 is fixed in the cavity of the driven gear. The driving gear 21 and the driven gear 22 are both cylindrical structures, the clutch spring 33 is sleeved over the outer peripheries of the driving gear and the driven gear, and a flange structure is arranged on the peripheries of each of the driving gear and the driven gear. The clutch spring respectively abuts against the two flange structures. The clutch spring functions to keep the first meshing teeth and the second meshing teeth normally separated through the elastic force, thereby disabling meshing fit.

The automatic door opening and closing mechanism further includes a spring holder 41 and a torsion spring 42. The driven gear 22 is rotatably arranged on the spring holder 41. The torsion spring 42 has one end connected to the driven gear 22 and the other end connected to the spring holder 41. As the driven gear 22 rotates, the driven gear 22 will continuously compress the torsion spring 42. The elastic force stored in the compressed torsion spring 42 is used to provide a counter-acting force and drive the door to rotate in a reverse direction along a power transmission chain.

Figure 3:
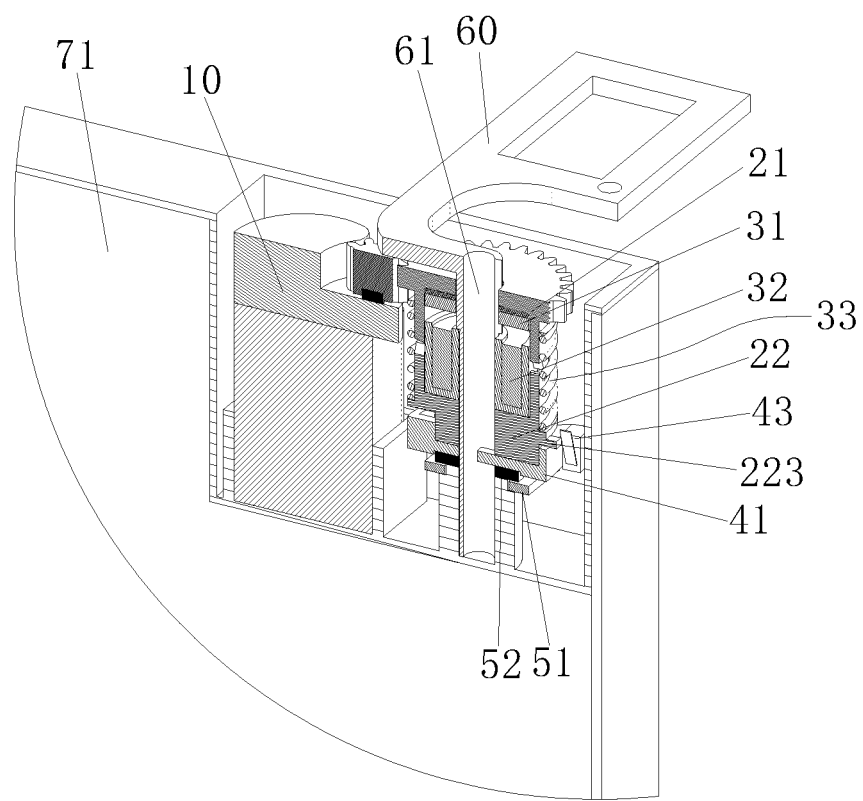
FIG. 3 is a schematic internal assembly diagram of the automatic opening and closing door structure according to the embodiment of the present disclosure.

Referring to FIGS. 2 and 3, in some embodiments, the spring holder 41 is provided with a receiving groove 411; the driven gear 22 has a matching protruding component 222, and the matching protruding component 222 is rotatably arranged in the receiving groove 411; the matching protruding component 422 and the receiving groove 411 form a receiving space, and the torsion spring 42 is arranged in the receiving space. That is, the driven gear 22 and the spring holder 41 form an installation fit, and the torsion spring 42 is built into the receiving space. This design saves structural space and is conducive to the miniaturization of the structure. Moreover, the receiving space is capable of limiting the torsion spring 42 to a certain extent and constraining the deformation path of the torsion spring 42, thereby avoiding the deformation failure of the torsion spring during long-term use. In this embodiment, the receiving groove is provided with a baffle that abuts against the torsion spring. As a result, the receiving groove is divided into two by the baffle, two receiving spaces are also formed, and two torsion springs are provided. This arrangement increases the upper limit of the elastic force stored in the torsion springs 42, making it possible to push the door with greater weight and overcome greater movement resistance.

In some embodiments, the driven gear 22 is provided with a contact protruding component 223, and the contact protruding component 223 is configured to rotate with the driven gear 22; protection switches 43 are arranged on the spring holder 41. The protection switches 43 are arranged on a moving path of the contact protruding component 223, and the contact protruding component 223 is capable of triggering the protection switches 43 during movement of the contact protruding component 223. The protection switches 43 are designed to be located at positions corresponding to the maximum deformation of the torsion spring 42, so as to prevent damage to the torsion spring due to excessive rotation of the driven gear 22 during the continuous output of the power assembly 10. Moreover, the protection switches 43 also serve as components that determine whether the resistance is abnormal during the opening or closing process of the door. After triggering a signal, the protection switches 43 will determine that the movement resistance of the door is abnormal. After receiving the signal, the control system functions to cut off the power to the electromagnetic coil.

Practical disclosure scenarios corresponding to the abnormal movement resistance of the door include but are not limited to: encountering obstacles during the entire process of opening and closing the door, and sudden intervention of the user's manual operation of opening and closing the door. The calibration of an abnormal resistance threshold is obtained through a test, and the effect of the abnormal resistance threshold is reflected through the mechanical design of the torsion spring.

In order to further simplify the structure and achieve multiple functions in one unit, the matching protruding component 222 in this embodiment is provided with a spring baffle 224 that matches the torsion spring 42, and the spring baffle 224 is located inside the receiving groove 411. The contact protruding component 223 is located outside the receiving groove 411. The contact protruding component 223 and the spring baffle 224 are connected to each other and integrally formed. The spring baffle 224 is configured to abut against the torsion spring 42, and its structure extends to the receiving groove 411 to form the contact protruding component 223. The contact protruding component 223 is an integrally formed component to match the protection switches 43, which is more convenient to manufacture and lower in cost during production.

The automatic door opening and closing mechanism further includes: an angular velocity sensor 51 and a magnetic ring 52. The angular velocity sensor 51 is installed on a predetermined structure. The magnetic ring 52 is installed on the spring holder 41 and matches the angular velocity sensor 51. The control system detects the rotation amount of the driven gear and the rotation amount of the door through the angular velocity sensor 61 and the magnetic ring 67.

The automatic door opening and closing mechanism further includes a hinge 60 having a fixed shaft 61; the spring holder 41 is fixedly connected to the fixed shaft 61; the spring holder 41 is provided with a limit stopper, and the limit stopper is embedded inside the fixed shaft 61 to fix the spring holder circumferentially. Both the driving gear 21 and the driven gear 22 are installed on the fixed shaft 61. The hinge 60 serves as a fixed and rotating shaft mechanism of the door. The upper and lower ends of the refrigerator door are both connected to the fixed shaft of the hinge, and a rotating shaft of the door is coaxial with the fixed shaft. The fixed end of the hinge is installed on a refrigerator body though screws.

Referring to FIGS. 1-3, in this embodiment, the driving gear 21 of the automatic door opening and closing mechanism is movably arranged along an axial direction of the fixed shaft 61; the driven gear 22 is relatively fixedly arranged along the axial direction of the fixed shaft 61; the driving gear 21 is close to or away from the driven gear 22 along the axial direction of the fixed shaft 61. By using the fixed shaft 61 as the basic support structure of the driving gear and the driven gear, the structural complexity is effectively solved. The fixed shaft 61 can not only serve as the rotating shaft of the door, but also serve as the basic structure of the automatic door opening structure to achieve the automatic door opening and closing function. Moreover, based on the principle of the counter-acting force of the torsion spring, the principle cooperation with the fixed shaft 61 is realized and the automatic door opening and closing function is thus achieved.

The fixed shaft 61 includes a first shaft segment 61*a* and a second shaft segment 61*b* that are connected to each other, and the diameter of the first shaft segment 61*a* is greater than that of the second shaft segment 61*b*; the driving gear 21 is installed on the first shaft segment 61*a*, the driven gear 22 is installed on the second shaft segment 61*b*, a limiting step 61*c* is formed at a joint of the first shaft segment 61*a* and the second shaft segment 61*b*, and the driven gear 22 has one end abutting against the limiting step 61*c* and the other end abutting against the spring holder 41. That is, the driving gear is capable of moving up and down on the first shaft segment, and completing the meshing and separation actions through the electromagnetic clutch assembly. The driven gear 22 remains stationary in the axial direction of the fixed shaft 61 and is only capable of rotating. The advantage of this arrangement is that it is capable of making the overall transmission chain more stable, thereby effectively transmitting a large torque. In addition, since the middle part of the driven gear 22 has a cavity structure and an electromagnetic coil is installed in the cavity, the driven gear 22 in this embodiment achieves a limiting and abutting fit through the fixed electromagnetic coil and the limiting step 61*c*.

The power assembly 10 includes a motor 11, a reducer 12 and an output gear 13. The output gear 13 is drivingly connected to an output shaft of the motor 11 through the reducer 12. The driving gear 21 is provided with a gear portion 212, and the output gear 13 meshes with the gear portion 212. Since the tooth ends of the corresponding meshing teeth of the driving gear 21 and the driven gear 22 are flat, when the driving gear 21 and the driven gear 22 are axially meshed, a situation where tooth tops of the first meshing teeth 211 collide with tooth tops of the second meshing teeth 221 and the driving gear 21 and the driven gear 22 are incapable of meshing in place may occur. Therefore, while the system controls the electromagnetic clutch assembly to execute a meshing instruction, it also needs to control the power assembly to execute a rotation instruction at the same time to drive the driving gear to rotate. In this way, the tooth tops of the first meshing teeth are staggered from the tooth tops of the second meshing teeth, so that the driving gear 21 and the driven gear 22 mesh with each other smoothly to transmit power. It can be seen from FIG. 1 that the gear portion 212 of the driving gear 21 is a complete gear plate, an annular structure extends from a side of the gear plate, annular first meshing teeth are provided on the annular structure, the rotation axis of the first meshing teeth is collinear with the rotation axis of the gear plate, and the first meshing teeth and the gear plate rotate in the same direction, thereby achieving more direct transmission and simple structure.

The action process and principle of the automatic door opening and closing mechanism of the present disclosure are as follows:

The control system receives automatic door opening and closing instructions and energizes the electromagnetic coil 32. The armature 31 comes close to the electromagnetic coil 32 under the action of a magnetic force, and the driving gear 21 comes close to the driven gear 22 at the same time under the action of the armature 31. The first meshing teeth 211 and the second meshing teeth 221 gradually engage and form a meshing fit. As the driven gear rotates, the driven gear 22 continuously compresses the torsion spring in the spring holder, and at this time the following two situations occur:

When the elastic force stored in the torsion spring is greater than the movement resistance of the door and the contact protruding component does not come into contact with the protection switches, the counter-acting force provided by the torsion spring is capable of driving the door to rotate in a reverse direction along the transmission chain. During the rotation process of the door, the control system detects the rotation amount of the door through the angular velocity sensor and the magnetic ring, and then controls the door to stop moving in a timely manner.

When the contact protruding component comes into contact with the protection switches and the elastic force stored in the torsion spring is still less than the rotation resistance of the door, the door cannot rotate. The control system receives a trigger signal from the protection switches and determines that the movement resistance of the door is abnormal. The control system is capable of immediately terminating a drive program and cut off the power to the electromagnetic coil to demesh the driving gear from the driven gear, thereby cutting off the movement connection between the door and the power assembly.

In addition, in the case where the system is in standby, or in the case of driving abnormality, power outage, disabled automatic door opening and closing function, or the like, the electromagnetic coil is powered off, the driving gear and the driven gear are demeshed, and the movement connection between the door and the power assembly is cut off. In this case, the rotation of the door will not drive the power assembly, the driving gear and the like to move together, the movement resistance is reduced dramatically, the movement loss of the power assembly is reduced dramatically, and the service life is extended.

Figure 4:
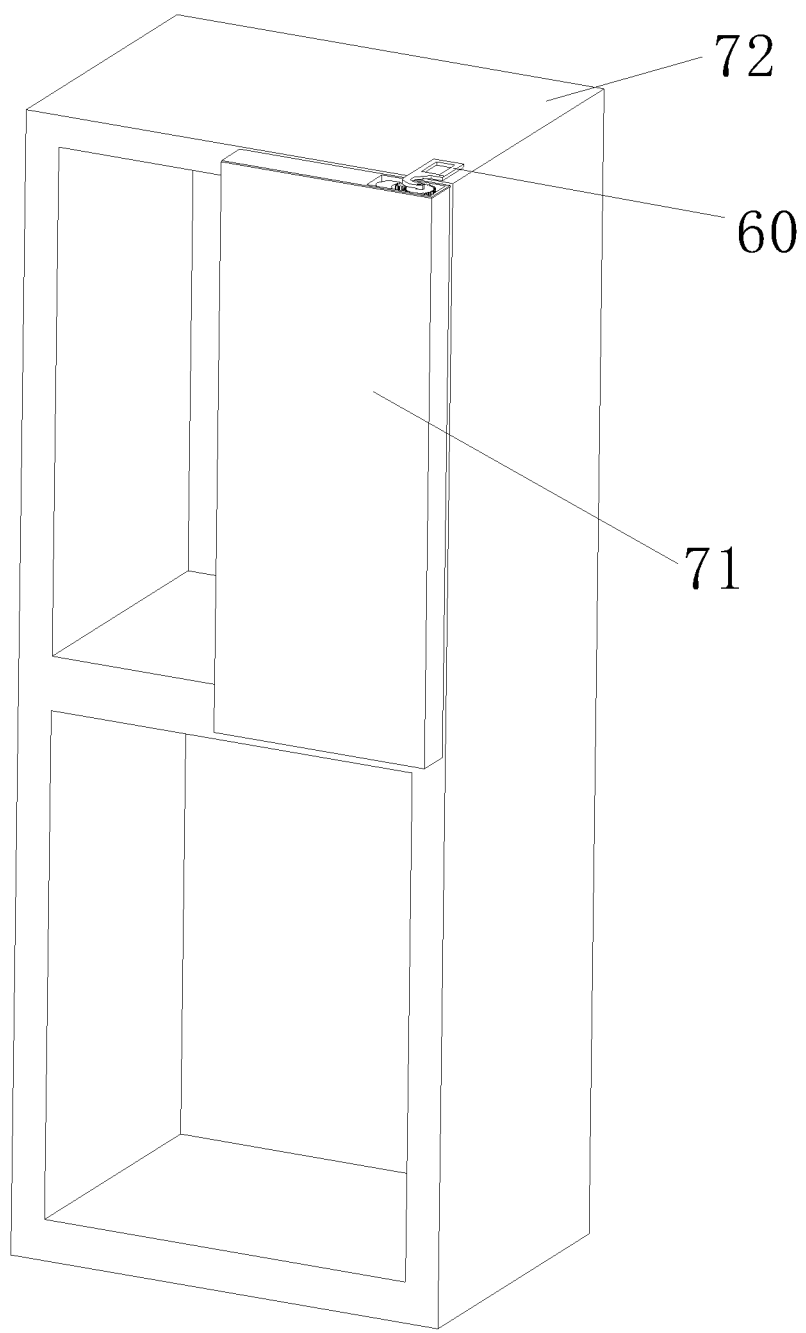
FIG. 4 is a schematic internal assembly diagram of a refrigerator according to an embodiment of the present disclosure.

The present disclosure further provides a refrigerator. As shown in FIG. 4, the refrigerator includes the automatic door opening and closing mechanism described in the above embodiment.

The refrigerator includes a door 71 and a refrigerator body 72, and the automatic door opening and closing mechanism is installed in the door 71. Because the automatic door opening and closing mechanism is placed in the door, a hidden installation design is realized, and the refrigerator of the present disclosure looks the same as an ordinary refrigerator. There is no need to add an ejection mechanism and other complex appearance parts that affect the appearance.

In some embodiments, the automatic door opening and closing mechanism includes a hinge 60, a spring holder 41, and torsion spring 42. The hinge 60 has a fixed shaft 61. The hinge 60 is fixed on the refrigerator body 72. The fixed shaft 61 is at least partially located in the refrigerator door 71. The door 71 rotates around the fixed shaft 61. The spring holder 41 is fixedly connected to the fixed shaft 61. The driven gear 22 is rotatably arranged on the spring holder 41. The torsion spring 42 has one end connected to the driven gear 22 and the other end connected to the spring holder 41.

The refrigerator of the present disclosure can sense the user's need to open the door through a control system, and the automatic door opening and closing mechanism can realize full automation of the door opening and closing process, completely freeing the user's hands and providing a good user experience. The automatic door opening and closing mechanism is modular and its advantages make it widely used. With high compatibility, the automatic door opening and closing mechanism can be adapted to most new and old models. This modular automatic door opening and closing mechanism solves the problem of limited disclosure scenarios of traditional automatic door opening and closing mechanisms, and is capable of flexibly adapting to various working conditions. Moreover, there is a complete mechanism protection device in the module, which is capable of extending the service life of the mechanism.

When users need to limit or completely disable the system's intelligence due to subjective reasons or objective reasons such as abnormal system operation, the system has necessary settable items that allow users to adjust its degree of automation.

It should be noted that the terms used herein are only for describing specific embodiments and are not intended to limit the exemplary embodiments according to the present disclosure. As used herein, the singular forms are intended to include the plural forms as well, unless the context clearly indicates otherwise. In addition, it should also be understood that when the terms "comprising" and/or "including" are used herein, they indicate the presence of features, steps, operations, devices, components and/or combinations thereof.

Of course, the above are some embodiments of the present disclosure. It should be noted that for a person of ordinary skill in the art, some improvements and modifications may also be made without departing from the basic principle of the present disclosure, and these improvements and modifications also should be considered as falling within the scope of the present disclosure.

What is claimed is:

1. An automatic door opening and closing mechanism, comprising:
   a power assembly, configured to provide a driving force;
   a driving gear, the driving gear being drivingly connected to the power assembly and the driving gear being provided with a first meshing tooth;
   a driven gear, the driven gear being movably arranged relative to the driving gear, and the driven gear being provided with a second meshing tooth matching the first meshing tooth;
   an electromagnetic clutch assembly, the electromagnetic clutch assembly being installed on the driving gear and the driven gear, and the electromagnetic clutch assembly being configured to drive the driving gear to mesh with or separate from the driven gear;
   a spring holder, the driven gear being rotatably arranged on the spring holder;
   a torsion spring, the torsion spring having one end connected to the driven gear and the other end connected to the spring holder; and
   a hinge having a fixed shaft;
   wherein the spring holder is fixedly connected to the fixed shaft, and both the driving gear and the driven gear are installed on the fixed shaft.

2. The automatic door opening and closing mechanism according to claim 1, wherein the electromagnetic clutch assembly comprises an armature and an electromagnetic coil, and the armature and the electromagnetic coil are respectively arranged on the driving gear and the driven gear.

3. The automatic door opening and closing mechanism according to claim 2, wherein the electromagnetic clutch assembly further comprises a clutch spring, the clutch spring is respectively connected to the driving gear and the driven gear, and the clutch spring is configured to apply a force to separate the driving gear from the driven gear.

4. The automatic door opening and closing mechanism according to claim 1, wherein:
   the spring holder is provided with a receiving groove;
   the driven gear has a matching protruding component, and the matching protruding component is rotatably arranged in the receiving groove; and
   the matching protruding component and the receiving groove form a receiving space, and the torsion spring is arranged in the receiving space.

5. The automatic door opening and closing mechanism according to claim 4, wherein:
   the driven gear is provided with a contact protruding component, and the contact protruding component is configured to rotate with the driven gear; and
   a protection switch is arranged on the spring holder, the protection switch is arranged on a moving path of the contact protruding component, and the contact protruding component is capable of triggering the protection switch during movement of the contact protruding component.

6. The automatic door opening and closing mechanism according to claim 4, wherein:

the matching protruding component is provided with a spring baffle that matches the torsion spring, and the spring baffle is located inside the receiving groove; and the contact protruding component is located outside the receiving groove, and the contact protruding component and the spring baffle are connected to each other and integrally formed.

7. The automatic door opening and closing mechanism according to claim 4, further comprising:
an angular velocity sensor, installed on a predetermined structure; and
a magnetic ring, installed on the spring holder and matching the angular velocity sensor.

8. The automatic door opening and closing mechanism according to claim 1, wherein:
the driving gear is movably arranged along an axial direction of the fixed shaft;
the driven gear is relatively fixedly arranged along the axial direction of the fixed shaft; and
the driving gear is close to or away from the driven gear along the axial direction of the fixed shaft.

9. The automatic door opening and closing mechanism according to claim 1, wherein the fixed shaft comprises a first shaft segment and a second shaft segment that are connected to each other, and a diameter of the first shaft segment is greater than that of the second shaft segment;
the driving gear is arranged on the first shaft segment, the driven gear is arranged on the second shaft segment, a limiting step is formed at a joint of the first shaft segment and the second shaft segment, and the driven gear has one end abutting against the limiting step and the other end abutting against the spring holder.

10. The automatic door opening and closing mechanism according to claim 1, wherein:
the power assembly comprises a motor, a reducer and an output gear, and the output gear is drivingly connected to an output shaft of the motor through the reducer; and
a gear portion is arranged on the driving gear, and the output gear meshes with the gear portion.

11. A refrigerator, comprising the automatic door opening and closing mechanism according to claim 1.

12. The refrigerator according to claim 11, wherein the refrigerator comprises a door and a refrigerator body, and the automatic door opening and closing mechanism is installed in the door.

13. The refrigerator according to claim 11, wherein the automatic door opening and closing mechanism comprises:
the hinge having the fixed shaft, the hinge being fixed on the refrigerator body, the fixed shaft being at least partially located in the door, and the door rotating around the fixed shaft;
the spring holder, the spring holder fixedly connected to the fixed shaft, and the driven gear being rotatably arranged on the spring holder; and
the torsion spring, the torsion spring having one end connected to the driven gear and the other end connected to the spring holder.

* * * * *